Feb. 28, 1928.
S. G. THOMSON
CONVERTIBLE WHEEL STRUCTURE
Filed March 3 1926
1,661,099
7 Sheets-Sheet 1
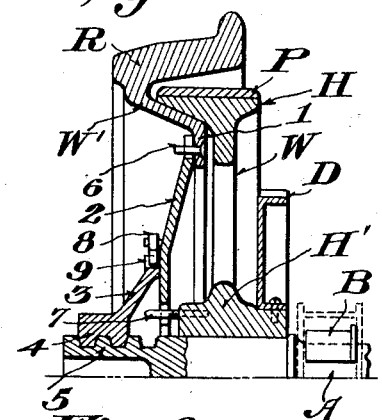
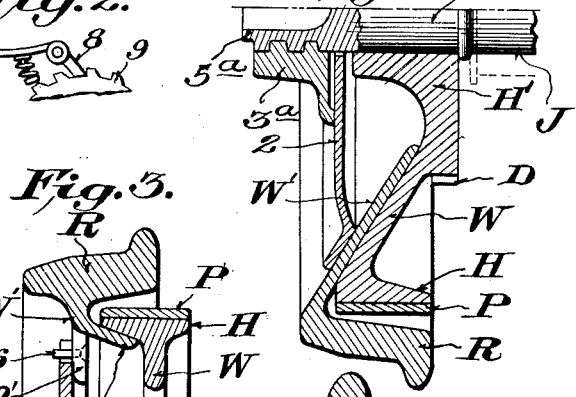
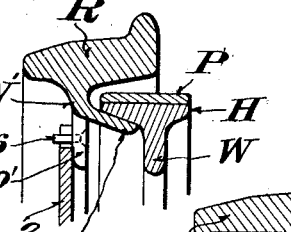
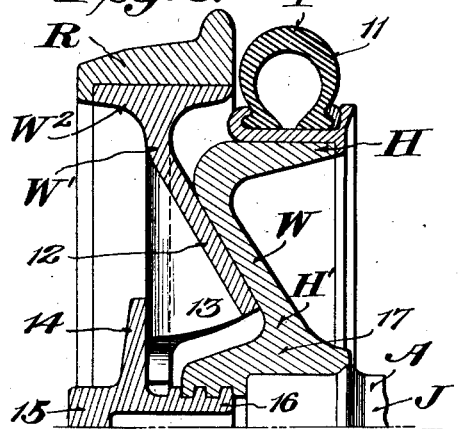
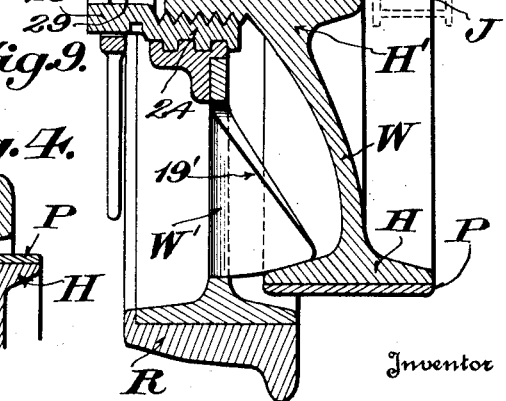
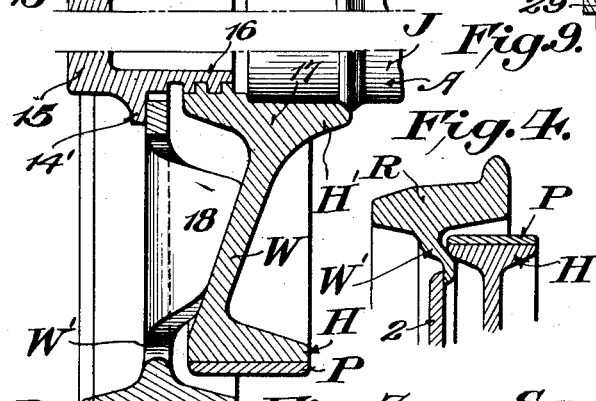
Inventor
Samuel G. Thomson,
By
Attorney Feb. 28, 1928.
S. G. THOMSON
1,661,099
CONVERTIBLE WHEEL STRUCTURE
Filed March 3 1926      7 Sheets-Sheet 2
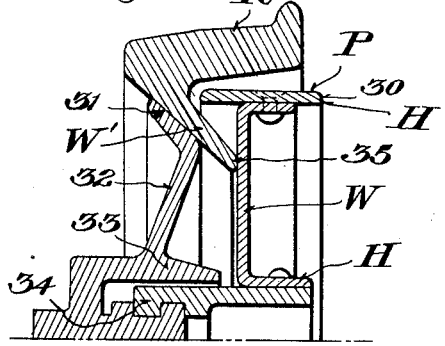
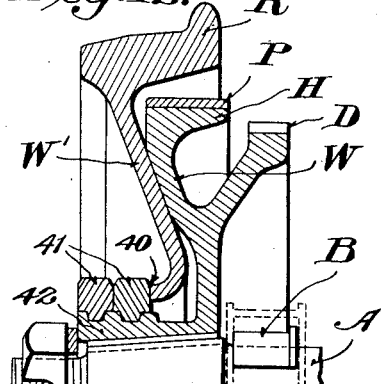
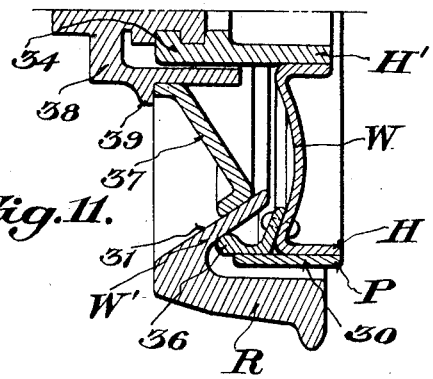
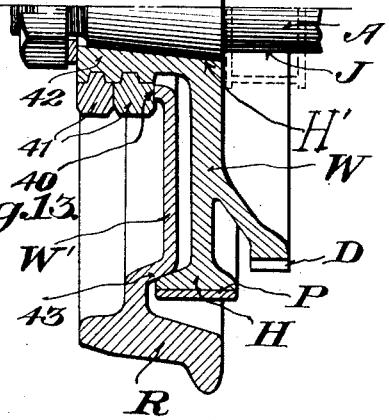
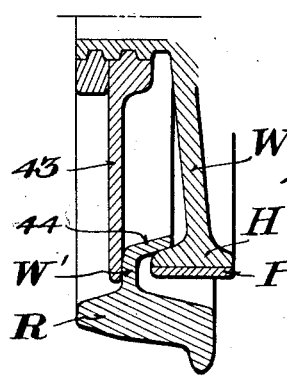
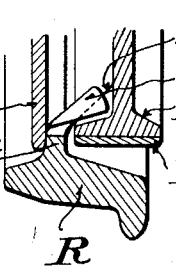
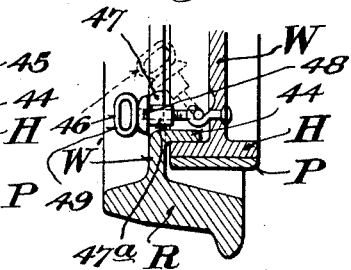
Inventor
Samuel G. Thomson,
By
Attorney Feb. 28, 1928.
S. G. THOMSON
1,661,099
CONVERTIBLE WHEEL STRUCTURE
Filed March 3 1926     7 Sheets-Sheet 3
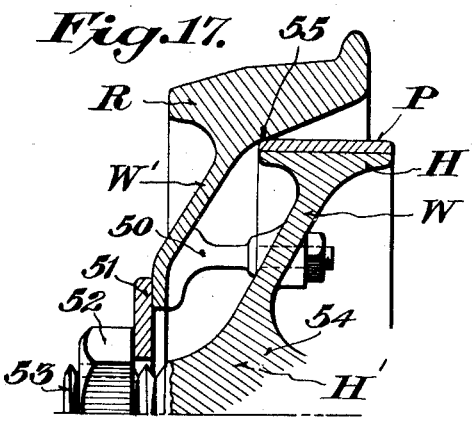
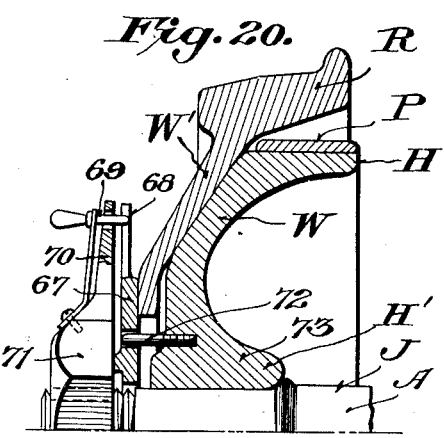
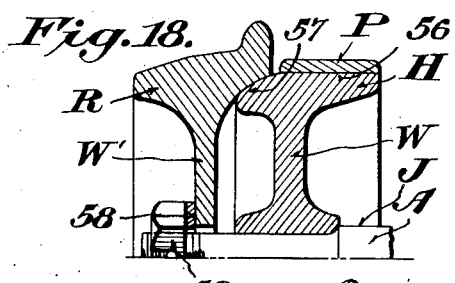
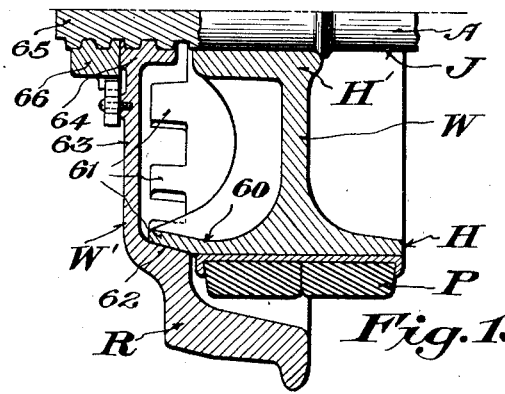
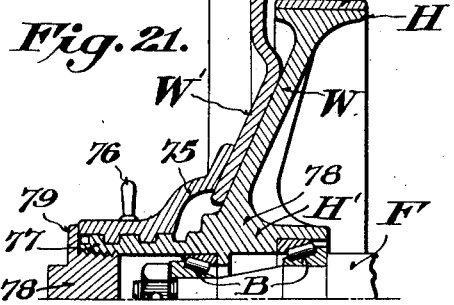
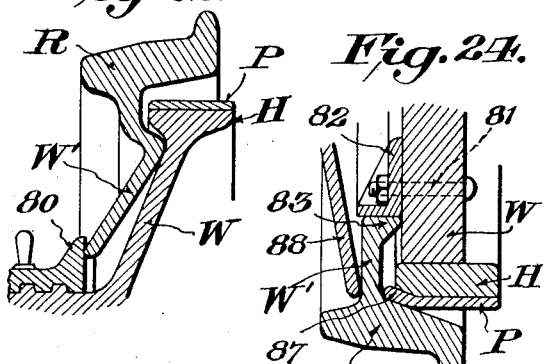
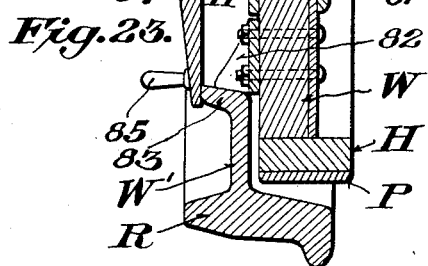
Inventor
Samuel G. Thomson,
By
Attorney Feb. 28, 1928.

S. G. THOMSON 1,661,099

CONVERTIBLE WHEEL STRUCTURE

Filed March 3 1926   7 Sheets-Sheet 4

Feb. 28, 1928.
S. G. THOMSON
1,661,099
CONVERTIBLE WHEEL STRUCTURE
Filed March 3 1926     7 Sheets-Sheet 5
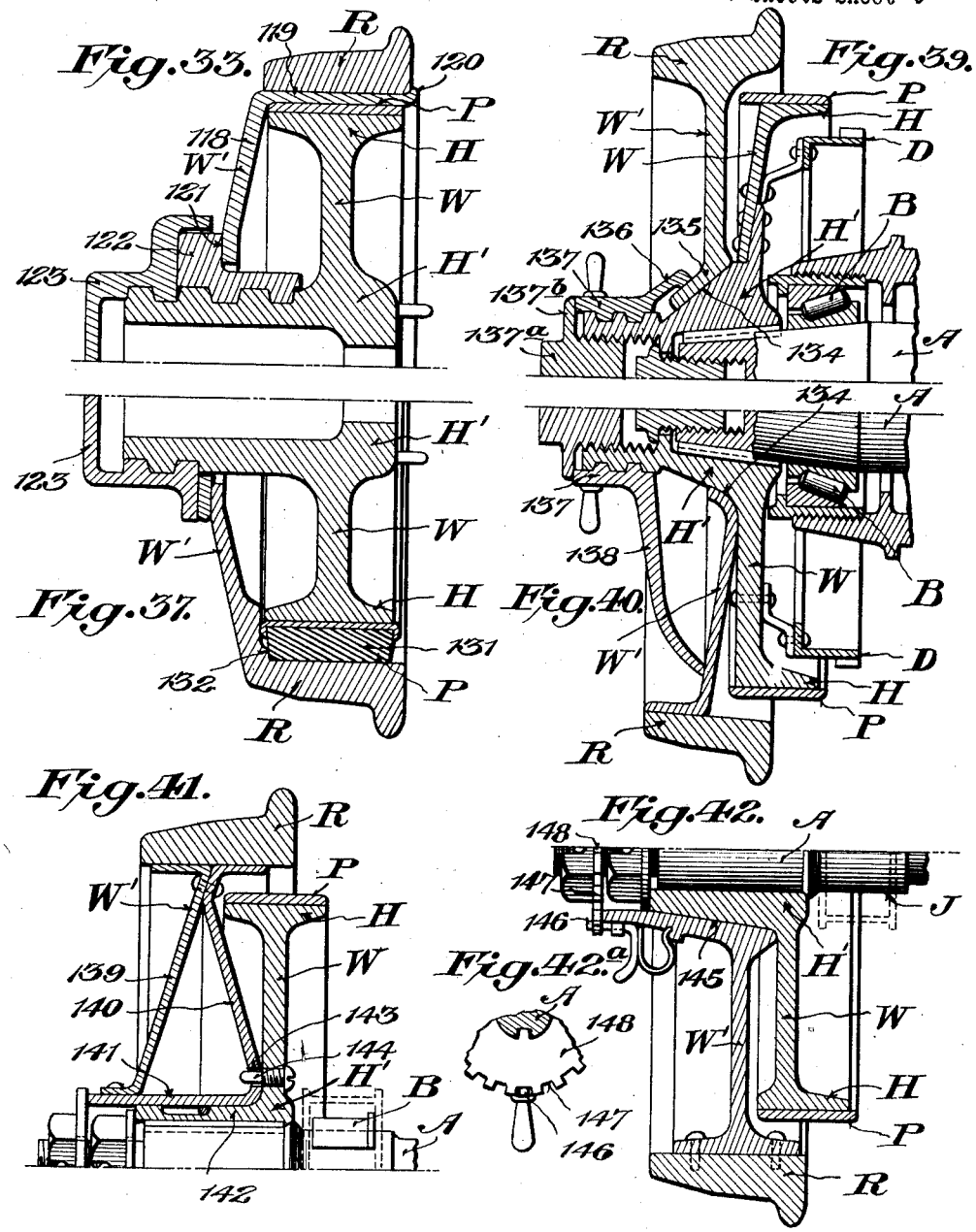
WITNESSES:—
Inventor
Samuel G. Thomson,
By
Attorney

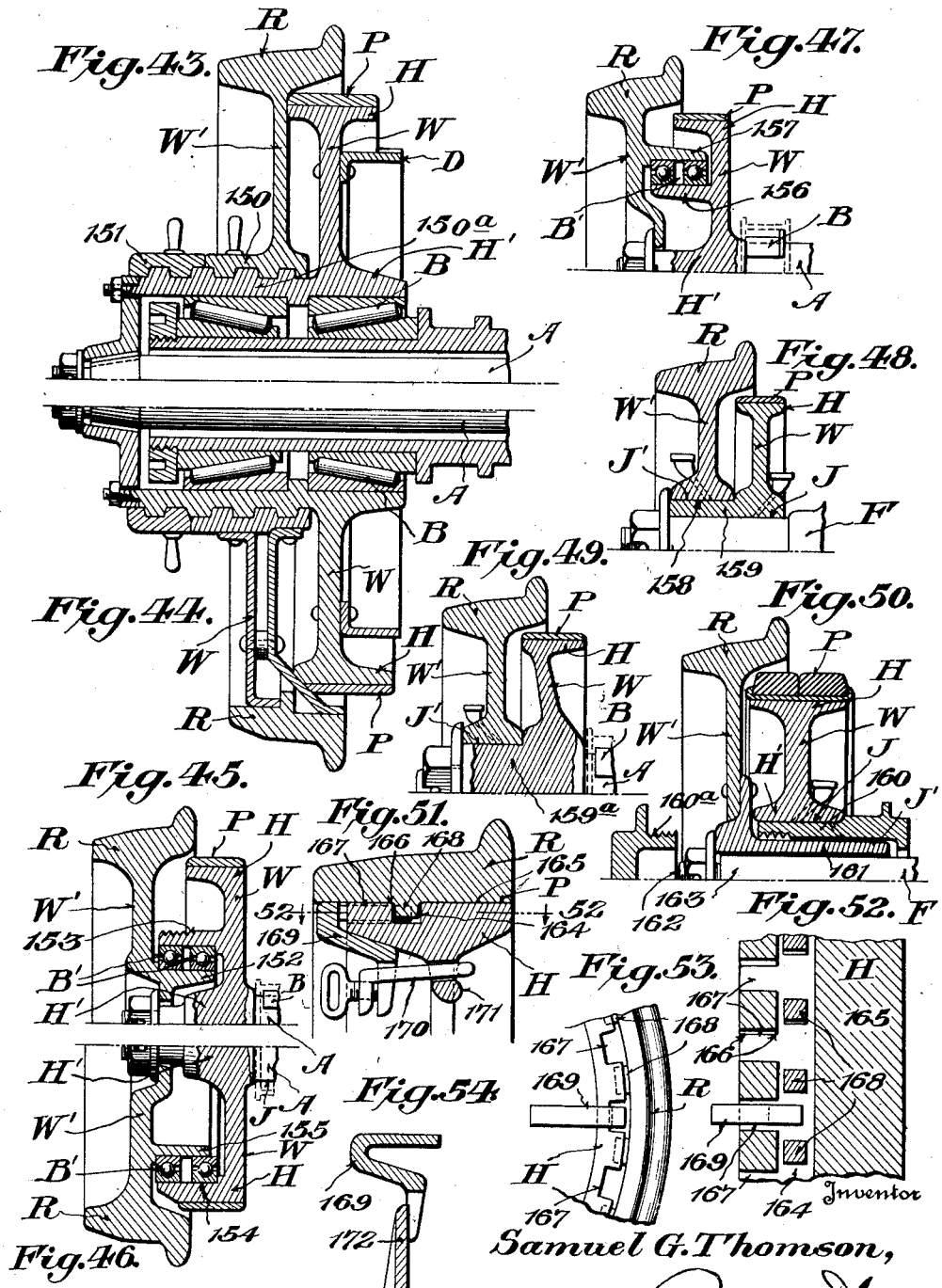

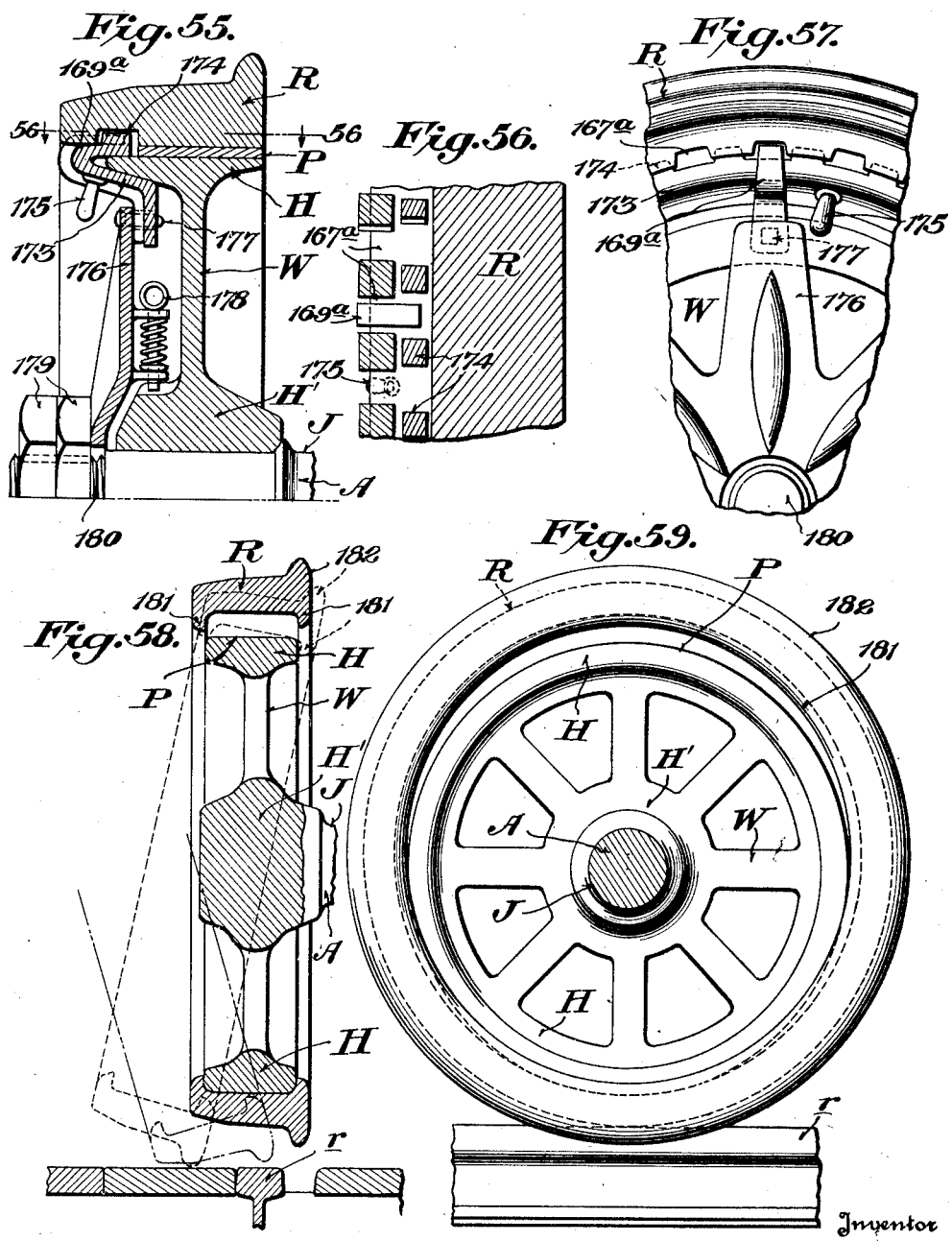

Patented Feb. 28, 1928.

1,661,099

UNITED STATES PATENT OFFICE.

SAMUEL G. THOMSON, OF NEW YORK, N. Y.

CONVERTIBLE WHEEL STRUCTURE.

Application filed March 3, 1926. Serial No. 91,998.

This invention relates to a wheel structure for use on vehicles which are adapted to run on both highways and railway tracks, and more particularly to such vehicles as are required by their service conditions to operate the greater portion of their time on highways, through city streets and over other surfaces without tracks, while their use on railway tracks is for only a relatively small portion of their route. This applies particularly to the handling of freight around and through large terminal areas, and the invention recognizes that, in the conversion of a wheel structure to operate over highways and railway tracks in such a service, it is desirable to construct the wheel structure so that the highway wheel may remain permanently on the axle, while the railway tread member may be applied and removed from the permanent wheel, as may be required to meet the relatively smaller needs of the track service, such as for short runs over the tracks to and from a railway classification or "break-up" yard, in which service the vehicles could be handled in trains by the usual locomotive. For the remaining greater portion of the day when the vehicle is used in collection and delivery service through the streets and around team yards, the wheel structure is adaptable to being geared to its own power unit on the vehicle, in order to accomplish self-locomotion and separate operation.

To accomplish a speedy and easy conversion of a wheel structure for such a service, the highway wheel is located inside of the railway member, which location of the highway wheel provides for connecting its hub in the usual way with chain drive and with inside geared differential drive, and with brake-drums and their operating mechanism.

With this wheel conversion in view, one of the primary objects of the invention is to provide novel means for clamping a removable flanged railway tread-member to the wheel in connection with which it is to be used, through the medium of clamping members and auxiliary devices which will hold the removable member tightly in its operating position on the permanent wheel, and yet at the same time permit it to be quickly applied and removed, thus providing for the change of the service of the vehicle to which the wheel is applied in a very short time.

The invention resides in the provision of a highway wheel permanently fixed on its axle and having a highway tread member which remains undisturbed in rail service, and with which wheel there is designed to coact a removable quickly applicable and releasable flanged railway tread-member.

In carrying out these objects, the invention is susceptible of a wide range of modification without departing from the spirit or sacrificing any of the advantages of the claimed invention; there being shown in the drawings for illustrative purposes certain preferred and practical forms, in which:

Figure 1 represents a transverse sectional view of a portion of a vehicle wheel embodying one form of this invention;

Fig. 2 is a detail side elevation of the spring-actuated pawl, and a portion of the disk employed in the fastening used in the form illustrated in Fig. 1;

Fig. 3 is a detail cross-sectional view showing a slightly different form of contact between the highway tread and the clamping plate illustrated in Fig. 1;

Fig. 4 is a view similar to Fig. 3, showing only a slight contact between the highway tread and the railway tread members of the wheel;

Fig. 5 is a view similar to Fig. 1, illustrating a slanting flange and web contact between the railway member and the highway wheel;

Figs. 6, 7, 8 and 9 represent similar views showing different forms of contact between the members, and different clamping means;

Figs. 10 and 11 represent sectional half views showing a pressed-plate or disc highway wheel, and slight annular contact between it and the railway member;

Figs. 12 and 13 represent sectional half views showing railway members with deep contacting flanges or disc members engaged directly by jam-nuts threaded around the wheel hub;

Figs. 14, 15 and 16 illustrate detail transverse sections showing slightly different arrangements of the under-rim contact and clamping members;

Figs. 17 and 18 represent detail sectional views showing the railway members contacting with the upper outer corner of the rim of the highway wheel, thus effecting an over-rim instead of an under-rim or web contact;

Fig. 19 represents a sectional half view of the type of wheel employed in auto trucks equipped with means for connection and locking with the removable railway member;

Fig. 20 represents a similar view to that shown in Fig. 19 illustrating a highway wheel having a convex coned bearing face for the railway member;

Fig. 21 represents a sectional half view showing a similar convex coned contact between the web of the railway wheel attachment and the highway wheel, with modified clamping means;

Fig. 22 is a detail sectional view, in which the contact between the convex face of the web member of the highway wheel and the railway attachment constitutes a small annular bearing;

Figs. 23 and 24 represent sectional views illustrating the usual type of wooden automobile wheel with this invention applied;

Fig. 25 represents a sectional half view of a wheel embodying still another form of the invention, in which ribs are provided on the outer face of the permanent wheel to form a seat for the detachable wheel members;

Figs. 26 and 27 represent sectional views showing the railway member seated on a portion flanged outwardly from the web of the highway wheel;

Fig. 28 represents a sectional half view of a wheel employing a railway member having no web or clamping flange;

Fig. 29 represents a view similar to that shown in Fig. 28 showing a different form of bearing between the railway member and the highway member;

Fig. 30 represents a transverse section of a portion of a highway wheel having a slightly convex outer bearing face for railway member, the clamping flange of the railway member having portions pressed outwardly to form intermittent seats on the clamping nut;

Fig. 31 represents a similar view showing another form of railway member without clamping flange and with over-rim bearing on the highway wheel;

Fig. 32 is a view similar to Fig. 31, in which the highway wheel is made T-shaped in cross-section with the top or outer face of the outer flange slightly coned to conform to the under face of the railway member, this outer flange being intermittently slotted to receive clamping flanges projecting from the railway member;

Fig. 33 represents a half-sectional view, in which the usual railway tire is shrunken around the cylindrical portion of a cupped plate with the remaining portion forming the web of the railway member;

Fig. 34 represents a detail transverse section showing a form similar to that shown in Fig. 33, in which the cupped plate is replaced by a plate-ring with its edges turned in opposite directions, to form a composite railway member;

Fig. 35 is a detail sectional view showing a railway member with an abbreviated clamping flange to act as a stop in holding the railway flanged member to exact track gauge. The railway member slips over and engages the working tread of the highway wheel;

Fig. 36 represents a detail transverse section showing a different arrangement of the same features as shown in Fig. 35;

Fig. 37 represents a view similar to Fig. 33 showing a highway wheel with the usual solid rubber tire, which forms a resilient cushion or bearing for the railway member;

Fig. 38 shows a detail transverse section showing a modified form of the same features illustrated in Fig. 37;

Fig. 39 represents a sectional half view showing the railway member as bearing on the highway wheel in the crotch or fillet between the wheel hub and web, with all other parts standing free of each other;

Fig. 40 represents a view similar to Fig. 39, embodying a slight modification thereof;

Fig. 41 represents a sectional half view showing a railway member having a cylindrical bearing around the outer face of the highway wheel hub and abutting the vertical web of the highway wheel, all other parts of the railway member standing free from the highway wheel;

Fig. 42 represents a similar view showing conical fitting faces instead of the cylindrical hub fitting faces in Fig. 41;

Fig. 42$^a$ represents a detail of the locking means employed in Fig. 42;

Figs. 43 and 44 are sectional half views illustrating highway wheels mounted on roller bearings, and a railway member having a hub portion threaded around the hub of the highway wheel;

Figs. 45 to 50 represent sectional half views illustrating different forms in which the coacting faces between the railway member and the highway wheel provide an additional or second rotating bearing for each wheel arrangement;

Fig. 51 represents a detail sectional view illustrating a form in which the cylindrical under face of the railway tire bears directly on the cylindrical tread or working face of the highway wheel;

Fig. 52 is a detail sectional view taken on the line 52—52 of Fig. 51;

Fig. 53 is a side elevation of the device shown in Fig. 52;

Fig. 54 is a detail section showing an alternate method for holding the key in position;

Fig. 55 is a sectional half view showing still another form of the invention illustrating coacting cylindrical bearing faces including the highway tread or working face;

Fig. 56 is a horizontal section taken on the line 56—56 of Fig. 55;

Fig. 57 is a side elevation of the device shown in Fig. 55;

Figs. 58 and 59 represent respectively a cross-section and side elevation of a loose or floating ring type of railway tire having a channel face to fit over and around the edges of the highway tire.

Similar reference characters represent corresponding parts throughout the several figures of the drawings.

In carrying this invention into effect, a number of different arrangements and combinations may be assembled, and therefore the different figures of the drawings are merely illustrative of various types and classifications. It is proposed to show, as a basis for classifying the various forms and for grouping the figures, a permanent inside highway wheel with which the outer railway tread contacts and in which the parts common to all the forms are designated as follows; to wit:

The highway wheel designated generally as H has a permanent tread P with a permanent web or spoke portion W connecting it with the hub H'. The removable railway flanged tread member is designated R, and the web thereof as W'. Other members common to the various forms and which have the same designation are: the revolving axle A; the fixed axle F; the bearing B between the axle and the highway wheel; the journal J between the axle and the highway wheel; the bearing B' between the railway wheel and the highway wheel; the journal J' between the railway wheel and the highway wheel, and the driving sprocket or rack D.

The various forms may be classified according to the contacting face of the outer railway tread member with the permanent inside highway wheel, and in this respect it will be noted, that the railway tread member is shown as bearing on the under side of the rim of the highway wheel or on the under side of its clamping web in Figs. 1 to 16 inclusive, while in Figs. 17 to 19 inclusive the railway member bears on the upper corner or projection of the highway wheel rim.

In Fig. 20, a wider slanting bearing on the upper side of a combined rim and web portion is shown; while in Figs. 21 to 27 inclusive, the railway member is shown as bearing on the upper convex sides of the highway wheel web, or on an abrupt projection fastened to the spoke or integral with the web of the highway wheel.

In Figs. 28 to 32 inclusive, other forms of railway members are shown as contacting with the upper outer portion of the highway wheel rim. In substantially all of the former figures, the contacting or bearing faces mentioned have been conical, and no part of them served also as the actual tread or wearing face of the highway tire.

In Figs. 33 to 38 and in 51 to 59 inclusive, is shown a series of cylindrical contact faces in which the actual working tread or contact face of the highway wheel with the street, also forms the bearing face for railway attachment when the vehicle is in rail service.

In Figs. 39 to 44 inclusive, are shown designs having hub-contact between the railway attachment and the highway wheel, all other parts standing free of each other, except in those shown in Figs. 43 and 44 where the outer edge of the rim of the highway wheel affords an abutting contact and face to partially assist in carrying the load.

In Figs. 45 to 50 inclusive, designs are shown where the contact between the railway attachment and the highway member takes the form of an additional revolving bearing, either roller or plain journal, thus forming the second of a pair of separate bearings for each highway wheel and its coacting railway attachment.

In the embodiment illustrated in Fig. 1, the railway tread member R is equipped with a web W' which projects inwardly from its outer edge and contacts with the under face of the rim P of the highway wheel H. The inner end or edge of the web W' of the railway member is arranged parallel with the web W of the highway member to form a clamping flange 1, which is engaged by a clamping disc or spider 2 extending adjacent to the hub H' of the highway wheel, but which clears said hub. This disc 2 is engaged by a clamping cone 3 having an internally threaded hub which has threaded engagement with an externally threaded hollow hub-extension 5 of axle A. This hub-extension also may be designed to be integral with hub H' of the highway wheel. Any suitable means may be provided for locking the members against relative rotation. As shown, such locking means comprises pins 6 and 7 carried respectively by the flange 1 of the web W' and by the hub H' of the wheel. These pins extend through apertures in the clamping disc 2. A spring-actuated pawl 8, shown in detail in Fig. 2, is fastened to the disc 2, and engages a ratchet 9 carried by the outer edge of the clamping cone 3. These locking devices are preferably provided, although the contacting surfaces between the clamping cone, the clamping disc, and the flange 1 of the tread member W' when the parts are tightly clamped together, should prevent relative rotation without requiring the use of locking devices. These locking devices are preferably used to convert the friction faces to positive stops or locks against relative rotation, so that a chain drive around the ratchet or rack D will positively drive the railway wheel member R through the clamping disc without any slipping or loosening of the parts. The ratchet lock also prevents the clamping nut from backing off from its tightened position.

In the forms shown in Figs. 3 and 4, the web W' of the railway tread member R depends from the middle of the under face of said tread instead of at its outer edge as is shown in Fig. 1. In Fig. 3, this web has alternate sections at intervals around the circle bent outwardly as shown at 10, the remaining portions engaging the under face of the wheel rim of the member H, while the bent-out sections 10 contact with the disk 2, and are connected therewith by means of pins 6. In Fig. 4, the web W' of the railway tread member R has only a slight bearing against the under outer corner of the wheel rim of the highway member H.

In the adaptation of the invention shown in Fig. 5, substantially the same arrangement of parts are shown as in Fig. 1, except that the locking devices are omitted, and the webs W and W' of the two tread members are arranged obliquely and engaged with each other, being held in clamping engagement by a disc 2 which bears against the central portion of web W'. The disc is secured by a clamping cone $3^a$ threaded around the axle extension $5^a$.

In Fig. 6, the highway wheel H is provided with a pneumatic tire 11, the tread of which is slightly larger in diameter than that of the tread of the railway member. This is about the maximum limit in the diameter of the member H relative to the tread R, and even this could not be attained with solid rubber or steel highway tires, because of the highway tread striking the tops of the rails at frogs and switches.

It will thus be seen that, in the preferred form of the invention, the tread-diameter of the highway wheel H is less than the tread-diameter of the railway member R. As shown in this figure, the railway member R comprises a standard flanged railway tire shrunken over a rolled rim $W^2$ having a T-section, the web W' of which is displaced at intervals to form contact or bearing projections 12 which engage the under face of the web W of the highway wheel. The skirt of the web W' is stretched into gussets 13 which unite the portions in original and displaced positions, instead of having these portions cut apart as is shown in Fig. 3. The edge of the skirt towards the wheel hub is engaged by a projecting flange 14 which extends radially from a clamping nut 15, the hub 16 of which is threaded externally to engage internal threads of the wheel hub 17.

The form shown in Fig. 7 is similar to that shown in Fig. 6, except that the skirt of the web W' is slit radially and partly cut away to provide a flange or lip 18 which is turned about 90° to bring its edge into contact with the slanting under face of the web W of the highway wheel H. In this form, the flange 14' is made slightly shorter than that shown in Fig. 6, otherwise the connection is the same.

The variation of the invention shown in Figs. 8 and 9 shows the railway member R constructed similar to the forms shown in Figs. 6 and 7, except that in these Figs. 8 and 9 the web W of the highway wheel H is convex toward the railway attachment, rather than concave or vertical as heretofore shown. The wide under faces of the rims of the wheels H in these forms are engaged by the edges of projecting contact flanges 19 and 19' respectively, which flanges are displaced at intervals from the web W' of the railway member. In the form shown in Fig. 8 the displaced projections 19 are joined to the original disc by gussets 20, while in Fig. 9 these projections are cut loose around two sides of a triangle and bent at a right angle position as in Fig. 7. The skirt or inner edge of the web W' of Fig. 8 carries one or more pins 21 which interlock with slots around the upright edge of a clamping ring 22. This clamping ring 22 is threaded internally with a left-hand thread to engage a similar external thread around the inner half of a clamping sleeve 24. This sleeve 24 has a right-hand thread internally to engage similar threads around the hub of the wheel H, the outer half of the sleeve being preferably squared as shown at 25 for the use of a wrench. Just inside of the squared portion is a series of holes arranged around the sleeve to receive a spring-actuated latch 26 carried by the clamping ring 22. Since the clamping sleeve 24 is interlocked with a projection from the end of the hub of wheel H, it is obvious that all the separate parts of the mechanism will be locked against relative rotation.

Any suitable means may be provided for locking the wheel hub H' and axle to the clamping sleeve 24, the design shown being in the form of an internally toothed rack 27 and a sliding ring 28 carrying a number of stiff springs 29 which act as a ratchet in engaging the toothed rack. The sliding ring is moved into and out of engagement along a squared extension $29^a$ of the axle.

It is to be noted that the right and left-hand thread arrangement between the wheel hub, the sleeve and the clamping disc provides a double-throw in applying and releasing the railway attachment.

Figs. 10 and 11 illustrate other variations, in which the highway wheels H are of the usual disc automobile type, except that they have flat steel tires 30. In both of these figures, the webs W' of the railway members R present flat under bearing faces 31 which in Fig. 10 is supported by a strut member 32 projecting from a centrally located clamping nut 33. This nut is internally threaded to the wheel hub 34.

In Fig. 10, the only contact of the railway member R with the highway wheel H, is at the inner edge of the web W' which engages the web W of the highway wheel as shown at 35.

In Fig. 11, a bulb-angle 36, forming part of the disc and outer rim of the highway wheel, affords the only contact of said wheel with the railway member R. The portion of the web W' of the railway member lying inside of the bulb-angle contact, is supported by a clamping cone 37 which fits over a clamping nut 38 and abuts a peripheral rib 39 formed integral with said nut.

In Figs. 12 and 13, modifications are shown in which the webs W' of the railway members R extend almost to the hubs 42 of the highway wheels H, and have their inner edges turned outward to provide clamping faces 40 for engagement by pairs of jam nuts 41 threaded around the wheel hubs 42. In Fig. 12, the middle portion of the web W' of the railway member engages the convex under face of the web W of the highway wheel, while in Fig. 13, the web W' of the railway member contacts only with the highway wheel under its rim as shown at 43.

In Figs. 14, 15 and 16, slightly different arrangements of under-rim contacts and clamping devices are shown. In all of these forms, the web member W' of the railway member R is short, thus providing a railway member of annular or ring form rather than of disc form. This requires in the clamping device of designs shown in Figs. 14 and 15, that the inner jam-nut 43 be in the form of a disc of large diameter to engage the vertical face of the web W'. A short portion of the abbreviated webs in these designs are turned inwardly to form a contact 44 under the rim of the wheel H. In Fig. 15, this contact 44 bears against and around the edge of a rib 45 on wheel H, the contacting web 44 being slit or partly cut away to allow portions to be turned around on one or both sides of the rib, in order to provide interlocking means for preventing relative rotation of the contacting parts.

In Fig. 16, the same design of web W' is shown as in Fig. 15, the difference residing in the clamping means, which in this case consists of swinging clamps 46 which engage slots 47 in the clamping web. These clamps comprise a threaded sleeve 47ª, a clamping collar 48, and a handle 49, and means for detaching the clamps from the highway wheel when the railway member is removed.

Another variation of the invention is shown in Fig. 17, in which web W of the highway wheel H has a convex outer face and carries a plurality of contact or bearing bolts 50 arranged at intervals around the wheel, and which are designed to support and afford clamping faces for the web W' of the railway member R. This web W' is held tightly against the bolt 50 by a central clamping washer 51 and a nut 52 threaded to a hub extension 53 of the highway wheel hub 54. The under face of the railway tread member R contacts with the upper outer corner of the highway tread member as shown at 55.

Fig. 18 shows a highway wheel H having a rim and web of T-section with a wide inside flange 56 designed to carry the highway tire. A short outside flange 57 carries the edge portion of the under face of the railway tread member R. This arrangement provides a lateral relation between the two treads which results in their having substantially the same tread-diameter, instead of the overlying relation shown in many of the other figures. In this form the web W' of the railway tread member R is held against the highway wheel by a clamping washer and nut shown at 58 and 59 respectively.

In the modification shown in Fig. 19, the usual type of auto-truck rubber-tired wheel H is illustrated, a feature of this design being that, around one edge of its rim 60 are arranged intermittent lateral projections 61 designed to carry the railway member R. The contact faces of these projections may be of any desired form, and are designed to engage an offset 62 formed on the inner face of the railway member R. Projecting from the edge of this offset 62 and integral with it, is a web 63 carrying at its inner end an internally threaded hub 64, which has threaded engagement with a threaded projection 65 of the axle. This hub 64 is shown locked in tightened position by a jam-nut 66, which is held against backing off by any suitable means.

In the form shown in Fig. 20, the railway member R is similar to that illustrated in Fig. 17, except that the upper face of the web W of the highway member H forms a contact for the web W' of the railway member throughout a greater portion of the width of said web, the lower end of said web standing free and being clamped by a plate 67 which is apertured as shown at 68 to receive a spring actuated latch 69 carried by an arm 70 projecting from a clamping nut 71. This clamping plate 67 is also provided with a plurality of apertures to receive corresponding pins 72 projecting laterally from the hub 73 of the wheel H. The clamping nut 71 is thus locked to rotate with the highway wheel but not with the railway member.

In the embodiment shown in Fig. 21, the railway member R has a wide web portion W' which contacts with a clamping web W of the highway wheel H, which wheel in this case is shown mounted on roller-bearings on a fixed wheel-pin such as is used in the usual automotive practice. The lower end of web W' is engaged by a clamping cone 75 equipped with handles 76 to facilitate its manipulation. This cone is threaded to an extension 77 on the hub 78 of the wheel H. This extension 77 is also internally threaded to a hub cap 78 having a collar 79 which operates as a jam-nut in locking the clamping cone.

In Fig. 22, a modification of the contacts between the webs W and W' is shown, in which there is only a small bearing adjacent to the rim of the highway wheel, the inner edge of the web W' being shown engaged with a clamping nut 80.

Figs. 23 and 24 show the usual type of automobile truck wheel, to the wooden spokes 81 of which are bolted seat-brackets or continuous seat-rings 82 for supporting the railway member R. In these forms of the invention the webs W' of the railway members are comparatively short, and each is flanged around its inner periphery as shown at 83 to widen its seating surface. The flange 83 in Fig. 23 is engaged by a clamping disc 84 equipped with turning handles 85, the hub 86 of this disc being threaded to the hub of wheel H, and locked against rotation in the same manner as in Fig. 21.

Fig. 24 shows an additional conical contact between the under face of the railway member R and a beveled portion 87 of the tire of the highway wheel H, while a clamping disc 88 engages the web W' adjacent to the rim of the railway member R.

Another form of the invention is shown in Fig. 25, in which the highway wheel H has brackets 90 projecting from the inside face of the web W to carry a chain drive rack D. Webs 91 project from the outside face of the wheel to form a seat for the railway member R. One or more studs 92 project from the edge of the inner peripheral flange 92ª of the web W' of the railway member R, and interlock with slots 93 formed in the periphery of a clamping plate 94. The hub 95 of the plate 94 is threaded around a clamping nut or hub-cap 96, which in turn is internally threaded to engage threads on the hub of wheel H, in order to form a right and left-hand threaded double-throw clamping device having the same operation as that described in Fig. 8. In both Figs. 25 and 26, the highway wheel has the usual type of journal contact J with a fixed axle F, and is held in position by the usual retaining washer and nut.

In the forms shown in Figs. 26 and 27, the railway member R is seated on tongues 97 and 97ª respectively, cut out from the web W. In Fig. 26, these tongues are cut loose around three sides and have their ends turned around a short radius to afford a seat against their flat sides for the inner end of the web W' of the railway member R; while in Fig. 27, rigid seats are afforded by the edge of the displaced portions 97ª which in this design are cut loose around two sides of a triangle and are joined to the upright web by gussets 98, similar to those shown in Fig. 8. It is to be noted however, that in the form shown in Fig. 8, the displaced portions are pressed out from the web W' of the railway member, while in Fig. 27 the displacement is from the web W of the highway member H.

In the embodiment illustrated in Fig. 28, the railway member R has no web or flange, and its section is that of the usual railway flanged tire, except that its under face slants in opposite directions from the middle as shown at 99 and 100, and varies only slightly from the cylindrical fit of the usual tire. The under slanting faces 99 and 100 are supported on one side by a rib 101 which projects from the tread of the highway wheel H, and on the other side by a flange 102 carried by a clamping member 103. The hub of this member 103 has coarse internal threads to engage corresponding threads around a hub extension of the wheel H. A spring-actuated latch 103ª is carried by the clamping member 103, and engages apertures in the wheel hub, in order to lock the part against relative rotation.

The form shown in Fig. 29 is similar to that shown in Fig. 28, except that the railway member R has a steeply inclined bearing on the highway member H as shown at 104. This member R is provided with a short web in the form of a rib 105 to take the side thrust in both directions. The clamping member 103 in this form is the same as in Fig. 28.

In the form shown in Fig. 30, the web member W' of the railway member R is slit at intervals around its inner periphery, thus forming tongues 106, the alternate tongues shown at 106ª being turned outwardly to form cylindrical load-carrying faces which contact with a clamping member 107 threaded around the hub of wheel H. The intermediate parts of the web W' form an upright clamping face 108 which abuts an inclined face 109 of the web W of the highway wheel H.

The form shown in Fig. 31 illustrates a railway member R which has no web, and the under face of which slants in one direction only and bears on an inclined portion 110 of the tread of highway member H. The outer face or edge of the railway tread member R has a series of notches 111 adapted to interlock with toothed projections 112 located on the periphery of a clamping plate 113 which is threaded around the hub of wheel H.

Fig. 32 shows a highway wheel H of T-section, having the outer face of the outer flange slightly coned to support the under face of the railway member R. The inner flange 114 of the highway rim is provided with a cylindrical top surface to which the highway tire 115 is attached. The railway member R is provided at intervals on its under face with a plurality of depending web members W' designed to register with slots 116$^a$ in the outer flange 116 of the highway wheel H. It is to be understood that the slots or the remaining carrying portions may occupy any desired proportion of the full circumference of the wheel. The members of the web W' which extend beyond the under face of the slotted rim are engaged by a clamping member 117.

In the adaptation of the invention shown in Fig. 33, the usual railway tire R is shrunken around the cylindrical portion 119 of a cupped plate 118, the body of which extends toward the wheel hub and forms the web W' of the railway member R. The railway member so formed, slips loosely over and bears on the outer tread face P of the highway wheel H, and its lateral movement is limited by the abutting of the edge thereof with the wheel rim. This fixes the location of the flanged railway tread at the proper track gauge. The rigid cupped plate 118 has a rib 120 to contact with the inner edge of the tread member R, and thus take the inward thrust of the flanged tire. The inner periphery toward the wheel hub of the member 118, which constitutes the web W' of the railway track member R, engages a rib 121 carried by a clamping nut 122, which is threaded around the wheel hub and locked by a suitable hub-cap 123, which also acts as a jam-nut.

In Fig. 34, the cupped plate shown in Fig. 33 is replaced by a plate ring 125 with its edges flanged in opposite directions as shown at 126 and 126$^a$ to form lateral stops for the flanged tire R. The tire may be shrunken tightly around the ring to form a composite railway member, or the ring and tire may be handled as separate parts.

In the form shown in Fig. 35, the flanged ring shown in Fig. 34 is omitted, and a stopping rib 127 substituted, which is shown as made integral with the flanged tire R.

In the form shown in Fig. 36, the under face of the tire R has a raised annular seat or flat rib 128, which bears on a portion of the rim of the highway wheel H at one side of its tire or tread portion 129. The seat 128 provides shoulders 128$^a$ and 128$^b$ which are clamped between the edge of the tire 129 and a clamping disc 130. It is to be noted that in this form of the invention, the fit of the annular seat over the rim of the highway wheel is permanent and is not affected by wear, as is the case where the under face of the tread member R is carried directly on the wearing face of the highway wheel.

The form shown in Fig. 37 is similar to that shown in Fig. 33, except that the tread member R and its web W' are integral, and fit over and enclose a solid rubber tire 131, which serves as a cushion in carrying the load, since no other part of the railway member contacts with the highway member except where its vertical face abuts the wheel rib, as shown at 132.

Fig. 38 shows a modification of Fig. 37, in which the tread member R has a short web W'. This requires a long clamping arm 133 to engage the outer face of W'.

In the forms shown in Figs. 39 and 40, a type of wheel is illustrated in which the railway member R bears on the highway wheel H in the crotch or fillet 134 between the wheel hub and web, all other parts standing free of each other. These bearing faces may be of any desired shape either conical, flat or curved.

In Fig. 39, the conical bearing flange 135, forming the hub portion of the railway wheel member R, is clamped directly to its seat by the short arm 136 of a clamping ring 137, which is threaded around the wheel hub of the member H and held in position by a flange 137$^b$ of a nut 137$^a$.

In Fig. 40, the curved fillet contact shown at 134 forms a fulcrum for the inner edge of the web member W', while the long arm 138 of the clamping disc makes contact and resists outward thrust at a point on the web W' near the under face of the tire. The clamping device employed is similar to that shown in Figs. 21 and 23.

Another form of the invention is shown in Fig. 41, in which the railway member R has its disc or web portion formed by a double plate, the members of which are numbered 139 and 140. They merge into a cylindrical hub 141, which fits loosely over and takes its bearing on the cylindrical outer face of the highway wheel hub 142. The plate 140 abuts the web W adjacent to the wheel hub, where interlocking apertures and pins 143 and 144 are provided to prevent relative rotation of the parts. All other parts of the railway member stand free from the highway wheel.

In the form illustrated in Fig. 42, a conical fitting face around the hub of the highway wheel provides a bearing for the hub of the railway tread R. This conical fitting face shown at 145 differs from the cylindrical hub face of Fig. 41, and it provides for the flanged railway member R being brought to the proper track gauge when clamped tightly against the member H'. The outer edge of the railway member hub carries a spring-actuated sliding bolt 146 which engages teeth 147 in the outer edge of a locking plate 148. This plate 148 is keyed to the axle A as is shown in detail in Fig. 42ª.

In the forms shown in Figs. 43 and 44, the highway wheel is mounted on roller-bearings similar to those employed in automotive practice for internal differential drives, the driving shaft revolving through the casing and being fastened by keys and bolted connections to the outer edges of the highway wheel hub 150ª, which hub in turn carries the railway member R threaded around its outer face. The railway member R is screwed to its gauge position abutting the rim of the highway wheel, and its hub portion 150 is locked by a ring 151 which operates as a jam-nut. In the form shown in Fig. 43, the outer abutting face of the highway wheel rim is substantially vertical and therefore gives little or no assistance in carrying the load, while in Fig. 44, the slanting faces which form the abutment assist in transmitting a part of the load through the highway wheel-rim and web.

In the forms shown in Figs. 45 to 50, the coacting faces between the railway member R and the highway wheel H provide an additional or second rotating bearing for each wheel arrangement. The arrangement shown in this group of figures provides what may be termed a "duplex assembly", each of which contains two complete wheels having independent revolution, which obviously require that none of their parts be in contact with each other except their interposed rotating bearings.

In Figs. 48 and 50, one of the bearings overlies the other, while the other figures of this group show one of the bearings as located inside of the highway wheel on a revolving axle and the other bearings outside interposed between the two wheels. In Figs. 48 and 50, the wheels are shown mounted on fixed pins or axles, while in the other figures the axle revolves.

In the form shown in Fig. 45, the intermediate bearing between the members R and H is of the usual ball-bearing type lying between a finished face of an inwardly projecting hub 152 of the railway wheel and a projection 153 from the web of the highway wheel.

In Fig. 46, the intermediate bearing is interposed between an under finished surface 154 of the rim of the highway wheel H and a projection 155 on the web of the railway member R.

In the form shown in Fig. 47, the intermediate bearing lies between projections 156 and 157 on the webs of the respective wheel members.

In the form shown in Fig. 48, a finished face 158 on the outwardly projecting hollow hub 159 of the highway wheel H, provides a journal for the railway wheel R, while the internal face of the hollow hub affords a common bearing which is a factor in the rotation of both wheels.

In the form shown in Fig. 49, the outwardly projecting hub 159ª which provides the journal for the railway wheel R is solid, and the second or common bearing which affects both wheels is provided by a bearing inside the highway wheel on a rotating axle.

In Fig. 50, a hollow fixed axle 160 provides a journal around its outer face for the highway wheel H, while its internal face or bore is finished to provide a journal for the inwardly projecting hub 161 of the railway wheel R. This hub 161 is also hollow to allow a tie-rod 162 to pass through it and through a hollow axle 163 to the assembly on its other end. Any suitable means may be provided for holding the railway wheel to its operative position, a retaining washer and nut being here shown. The tie-rod is removed with the railway wheel and the internal bearing is protected by a hub cap 160ª.

In all of the figures of this series except Fig. 50, the railway wheel R is held to its operating position by the usual retaining washer and nut attached to a stud, or to a threaded end of the wheel-pin or wheel hub extension.

In the embodiment illustrated in Figs. 51, 52, 53, the cylindrical under face of the railway tire or tread member R bears directly on the cylindrical tread or working face P of the highway wheel H. The outer tread face of the highway wheel H is grooved circumferentially as shown at 164 and also in Fig. 52 which is a sectional view at line 52—52, Fig. 51. A normal tread width 165 on one side of this groove is provided, while the other narrower side 166 is slotted transversely at intervals as shown at 167 extending through the edge of the rim. The railway member R is provided on its under face with a plurality of projections shown in the form of squares 168 which register with the slots formed in the outer face of the tread member of the wheel H. In applying the tire R, the projections 168 are slipped through the slots 167 of the railway member into the circumferential groove 164, and are then turned through the groove to a locked position behind the projections which remain between the slots and which extend around the highway wheel-rim adjacent to its edge. A key 169 is inserted in one of the spaces between the projections 168 to prevent relative rotation of the wheel tread members. This key 169 is held in position by a clamp 170 which links around it and around a hooked projection 171 formed by displacing a portion of the web W of the highway wheel H. This key 169 and the clamp 170 are designed to be removed with the railway member R.

In Fig. 54, a slightly different form of key is shown, in which a clamping disk or spider 172 is substituted for the link to hold the key in operative position.

Another variation of the invention is illustrated in Figs. 55, 56 and 57, in which coacting cylindrical bearing faces are provided which include the highway tread or working face. In this form of the invention, the railway tire R is slotted transversely as shown at 167ª, and the railway member is slipped over the cylindrical tread of the highway member. A retaining clamp 173 having squared projections 174 around its upper face corresponding to the slots in the under face of the railway tire, is then entered through the slots and turned by attached handles 175 until its squared projections are positioned behind the squared projections of the railway tire. The retaining clamp 173 is thus keyed to the railway tire, and is then locked against relative rotation by inserting a key 169ª between the squared projections. The railway tire and the retaining clamp and key in these relative positions are equivalent to a tire having an integral clamping flange, and when applied, are clamped to the edge of the highway wheel rim by a clamping disk or spider 176 carrying pins 177 around its edge to interlock with apertures in the retaining clamp and key. The clamping disk 176 also carries a spring-actuated latch 178 to engage a socket in the hub of the wheel member H, and thus locks the entire appliance against rotation relative to the highway wheel. The clamping disk or spider 176 is held in tightened position by any suitable means, jam-nuts 179 being here shown threaded around an extension 180 of the axle.

A loose floating ring type of railway tire is shown in Figs. 58 and 59, in which the former is a cross-section and the latter a side elevation. This tire R has a channeled inner face to fit over and around the edges of the highway wheel tire P. The flanges 181 around the edges of the tire R are similar in height to the track flange 182 around its opposite outer face and forming part of the standard railway wheel contour. The internal diameter of the railway tire R between the flanges 181 is considerably greater than the external tread-diameter of the highway wheel H, so as to slip around the latter into operating position. The railway member R may be applied by hanging the railway tire over the top of the highway tread and then raising the highway wheel sufficiently to allow the railway tire to slip under it to its vertical operating position, or by first raising the highway tire sufficiently to allow the railway tire to be slipped under it and then letting the highway tire down between the flanges as the top of the railway tire swings over to its vertical operating position. No clamps, keys or holding means are necessary in this form of the invention, since the weight of the load will keep the railway tire in operative position, and there is no more tendency for the tire to come off or for the highway wheel to jump over the inside flanges, than there is for the outside track flange to jump over the rail and off the track.

Fig. 58 shows the location of the top of the track rail $r$ relative to the tread of the highway wheel when the wheel is raised sufficiently high for the application of the railway wheel shown in dotted lines. In Fig. 59, the wheel is shown in operating position with its tread resting on the rail $r$.

From the above description it will be seen that in all the forms shown, the convertible railway and highway wheel includes a highway wheel to be permanently mounted on the vehicle and a railway tread member applicable and removable according to the needs of the service, the means employed for effecting such change being such as to permit the change to be made quickly and easily.

It is to be understood that while the highway wheel H is shown permanently mounted on the axle it may be equipped and is intended to be equipped with removable tires or demountable rims such as are common in automotive practice to provide for their being removed and replaced to take care of wear and damage. Hence it will be seen that this invention contemplates the combination of what may be termed a fixed tire which can be either removed and replaced with some facility in making repairs, in combination with a quick release tire which can be taken off and replaced with much greater facility as part of the daily service of the vehicle. This arrangement provides a wheel center with two separate tire or tread members adapted to the wheel center so that one of said members is more easily removed and replaced than the other.

Without further description it is thought that the features and advantages of the invention will be readily apparent to those skilled in the art, and it will of course be understood that changes in the form, combination of parts, proportion and minor details of construction may be resorted to, without departing from the spirit of the invention or scope of the appended claims.

I claim:

1. A convertible wheel structure for vehicles comprising a highway wheel, and means for providing said wheel with an integral annular flanged member suitable for service on a railway track, and a centrally located clamping member.

2. A convertible wheel structure for vehicles comprising a highway wheel having radial thrust receiving faces, and an integral annular flange tread member for railway tracks adapted to abut said thrust receiving faces within a cylindrical surface coaxial with the wheel rim and intersecting its outer under corner.

3. A vehicle wheel structure convertible to highway and railway track, said structure comprising a wheel having a fixed or tightly fastened highway tread, and an easily removable integral annular flanged tread, and centrally located clamping means.

4. A convertible wheel structure for vehicles comprising a highway wheel, and a quickly releasable integral annular flanged tread member coacting with said highway wheel for converting it into a railway wheel, and centrally located clamping means.

5. A convertible wheel structure for vehicles including integral annular tread members for highways and for railways, the highway tread diameter not being substantially greater than the railway tread diameter, and centrally located rotating clamping means.

6. A convertible wheel structure for vehicles comprising a highway wheel having a tightly fastened tread, an integral annular flanged tread adapted to run on railway tracks, said flanged tread being greater in diameter than said fixed tread, and centrally located rotating clamping means.

7. A convertible wheel structure for vehicles comprising a highway wheel, an attachment having an integral annular member to adapt said wheel to railway track, and centrally located clamping means to hold said parts together.

8. A convertible wheel structure for vehicles comprising a highway wheel, an attachment to adapt said wheel to railway track, a centrally located rotating clamping member and means for locking or limiting the rotation of said attachment relative to the highway wheel.

9. A convertible wheel structure for vehicles comprising a highway wheel, an attachment to adapt said wheel to railway track, a centrally located clamping member for said attachment, and means for locking or limiting the rotation of said clamping member relative to the tread member.

10. A convertible wheel structure for vehicles comprising a highway wheel, an attachment to adapt said wheel to railway track, a plurality of centrally located clamping members, and means for locking one of said members against rotation relative to the other.

11. A vehicle wheel having a rim and a highway tire, and an integral annular tread member lying laterally on one side only of said tire and adapting said wheel for use on a railway track, said tread member having an annular clamping flange with its inner circumferential edge lying within a surface coaxial with the wheel rim and intersecting its outer under corner.

12. A vehicle wheel having a highway tire, and a separate integral annular tread member lying laterally on one side only of said tire and adapting said wheel for use on a railway track, and a clamping member having an annular bearing around the outer face of said tread member.

13. A convertible wheel structure for vehicles comprising a wheel having a highway tread, and an attachment for said wheel to adapt it to run on a railway track, said attachment having an integral annular tread member lying laterally adjacent to one side only of said highway tread, and having a load-carrying face abutting said wheel within a cylindrical surface coaxial with the wheel rim and intersecting its outer under corner.

14. A convertible wheel structure for vehicles comprising a highway wheel, and an attachment adapting said wheel to run on a railway track, said attachment having an integral annular tread member to stand entirely free from one side of said highway wheel and to afford a thrust bearing against said wheel within a cylindrical surface coaxial with the wheel rim and intersecting its outer under corner.

15. A convertible wheel structure for vehicles comprising a highway wheel, and a detachable integral annular tread adapted to run on a railway track, and separate clamping means engaging said tread and extending to the wheel hub.

16. A vehicle wheel structure convertible to highway and to railway service, said structure comprising a highway wheel, and a separate integral annular tread member coacting with said wheel and abutting it within a cylindrical surface coaxial with the wheel rim and intersecting its outer under corner.

17. A convertible wheel structure for vehicles comprising a highway wheel, a separate integral annular flanged tread attachment for said wheel, and a separate clamping member having a portion lying adjacent to the wheel hub.

18. A convertible wheel structure for vehicles comprising a highway wheel having a fixed or tightly fastened tread, and a quickly releasable attachment having an integral annular tread adapted to railway track, said annular tread to stand entirely free from one side of said fastened tread, and to afford a thrust bearing against said highway wheel within a cylindrical surface coaxial with the wheel rim and intersecting its outer under corner.

19. A convertible wheel structure for vehicles comprising a wheel having a rim and tread adapted to highways, and a separate integral annular tread member adapted to railway track and standing entirely free from one side of said highway rim, said annular tread member having a portion to abut said highway wheel within a cylindrical surface coaxial with its rim and intersecting its outer under corner.

20. A convertible wheel structure for vehicles comprising a wheel having a highway rim and tread, and an attachment coacting with said wheel to adapt it to railway track, said attachment comprising a tread member having a flat portion on its under face to lie adjacent to said highway rim and tread, said tread member having a load-carrying face abutting said wheel within a cylindrical surface coaxial with said rim and intersecting its outer under corner.

21. A convertible wheel structure for vehicles comprising a highway wheel tread and rim, and a separate flanged tread member having a web or spoke portion projecting radially inward and standing entirely free from at least one side of said rim, said tread member having a load-carrying seat to lie within a cylindrical surface coaxial with said rim and intersecting its outer under corner.

22. A convertible wheel structure for vehicles comprising a wheel having a highway rim and tread, and another tread member to stand entirely free from at least one side of said rim and tread, said tread member having a load-carrying portion lying within a cylindrical surface coaxial with said rim and intersecting its under outer corner.

23. A convertible wheel structure for vehicles comprising integral annular rim and tread members for highways and for railways, the highway rim and tread remaining undisturbed in both kinds of service, and clamping means having a member with its inner portion lying adjacent to the wheel hub.

24. A convertible wheel structure for vehicles comprising a highway wheel, and a detachable integral annular tread member adapted to run on a railway track, said tread member adapted to stand entirely free from one side of said highway wheel, and to have a load-carrying portion lying within the under faces of the wheel rim.

25. A convertible wheel structure for vehicles comprising a highway wheel, a detachable integral annular tread member to adapt said wheel to a railway track, and a clamping member adapted to rotate coaxially with said wheel into a tightened position.

26. A convertible wheel structure for vehicles comprising a highway wheel, an integral annular tread attachment to adapt said wheel to railway track, and a clamping member having a tightening movement rotating relative to and coaxially with said highway wheel.

27. A convertible wheel structure for vehicles comprising a highway wheel, a separate integral annular tread member adapted to run on a railway track, and a clamping member adapted to draw into a tightened position by a rotating coaxial motion relative to said wheel.

28. A convertible wheel structure for vehicles comprising a highway wheel, a separate integral annular tread member adapted to run on a railway track, and a clamping member having a threaded portion coaxial with said wheel.

29. A wheel for vehicles comprising a highway rim and tread, and a separate integral annular tread member flanged for use on railway track, said member to stand entirely free from one side of said rim and tread, and to have a load-bearing face lying within the cylindrical surface coaxial with said rim and intersecting its outer under corner.

30. A convertible wheel structure for vehicles adaptable to run on the highway and on a railway track, said structure comprising a fixed or tightly fastened highway rim and tread, and an integral annular flanged railway tread member to stand entirely free from at least one side of said highway rim and tread, said tread member having a load-carrying face lying within the under surface of said rim.

31. A convertible wheel structure for vehicles comprising a wheel centre, a tread member adapted to the highway, and another tread member to stand free laterally from the rim portion of said highway member and so adapted to the wheel centre that it is more easily removed and replaced than the said highway tread member, one of said members having a load-carrying face lying within the circle defined by the under face of the rim carrying the other tread.

In testimony whereof I hereunto affix my signature.

SAMUEL G. THOMSON.